United States Patent Office 2,773,064
Patented Dec. 4, 1956

2,773,064

7-SUBSTITUTED AMINO-BENZ [c] ACRIDINES AND SALTS THEREOF

Edward F. Elslager, Harper Woods, Franklin W. Short, St. Clair Shores, and Marie-Jo Sullivan, Grosse Pointe Woods, Mich., assignors to Parke, Davis & Company, Detroit, Mich., a corporation of Michigan No Drawing. Application December 2, 1953, Serial No. 395,830

9 Claims. (Cl. 260—279)

This invention relates to a class of new benzacridine compounds and to a process for producing the same. More particularly, the invention relates to substituted benz[c]-acridine compounds having the formula,

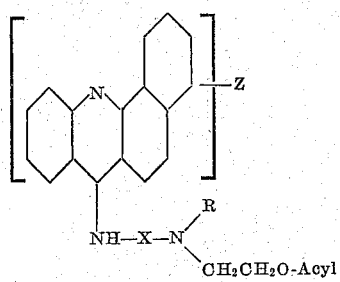

and acid addition salts thereof; where Z represents a hydrogen, halogen, or alkyl or alkoxy radical containing not more than 2 carbon atoms, X is a divalent alkyl group containing from 2 to 5 carbon atoms, R is a hydrogen, lower alkyl, or lower hydroxyalkyl radical or acyl derivative thereof having the formula alkylene-O-Acyl, and Acyl is an aliphatic carboxylic acid acyl residue containing from 2 to 18 carbon atoms. The term "lower" used in this connection herein and in the attached claims refers to hydrocarbon groups containing not more than five carbon atoms.

The new compounds possess useful amebacidal properties and in general are characterized by their toxicity to *E. histolytica.* The new compounds may be employed in the form of the free base having the above formula or the acid addition salt with an organic or inorganic acid. In general, acid addition salts of any relatively non-toxic organic or inorganic acids are suitable. Some examples of typical salts are the hydrochloride, hydrobromide, sulfate, phosphate, oxalate, sulfamate, acetate, lactate, tartrate, gluconate, pamoate, citrate, cresotinate (especially methylene di-o-cresotinate), naphthoate (especially 3-hydroxy-2-naphthoate), salicylate (especially 5,5'-methylene disalicylate), benzoate and the like. One of the preferred sulfonic acid salts is the mono- or di-salt of 8-hydroxy-7-iodo-5-quinoline sulfonic acid. This salt has an advantage in that the acid moiety itself possesses amebacidal properties.

In accordance with the invention the new 7-[ω-(β-acyloxyethyl)aminoalkylamino]benz[c]acridine compounds are produced by acylation of the corresponding 7-[ω-(β-hydroxyethyl)aminoalkylamino]benz[c]acridine compounds or acid addition salts thereof. Acylation is accomplished by treating the corresponding 7-[ω-(β-hydroxethyl)aminoalkylamino]benz[c]acridine compound with an acyl halide or acyl anhydride having an aliphatic carboxylic acid acyl residue containing from 2 to 18 carbon atoms. The temperature during the process can be varied widely but a temperature of about 50° C. to 110° C. is preferred. In general, temperatures in excess of 150° C. should not be used. It will usually be satisfactory to employ approximately equivalent quantities of the reactants, but if desired an excess of either of the reactants can be employed.

The reaction involved may be diagrammatically illustrated as follows:

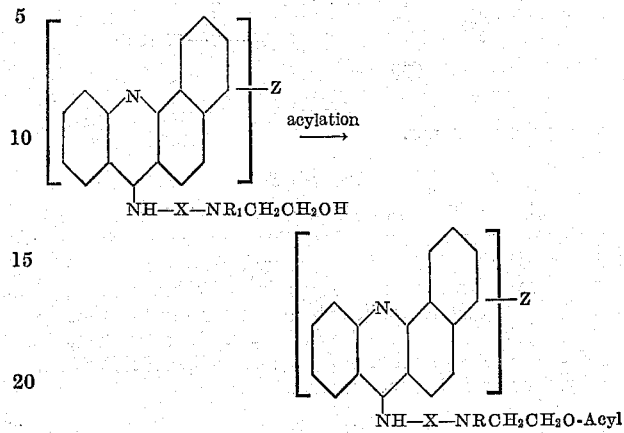

where R, X and Z have the same significance as given above, and $R_1$ is a hydrogen, lower alkyl or lower hydroxyalkyl radical.

The invention is illustrated by the following examples.

Example 1

An intimate mixture of 17.9 g. of anhydrous 7-{γ-[ethyl-(β-hydroxyethyl)amino]propylamino}benz[c]acridine dihydrochloride, and 4 g. of succinic anhydride is heated at 130° C. for 24 hours. The melt is cooled to 70° C., boiling ethanol is added, and the resulting solution is allowed to cool. Dilution with petroleum ether gives a viscous tar which solidifies when it is ground in a mortar under ether. The yellow-green hygroscopic solid thus obtained is purified by reprecipitation from dimethylformamide by ether. This product, 7-{γ-[ethyl(β-succinyloxyethyl)amino]propylamino}benz[c]acridine, dihydrochloride, has the formula,

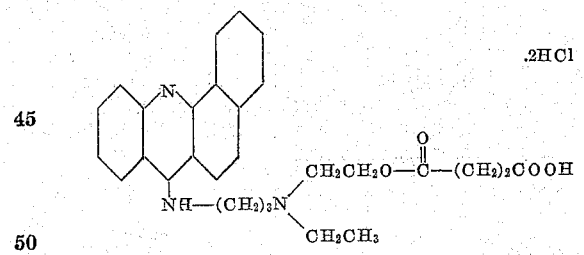

Upon standing the product takes up 1½ moles of water of hydration. This hydrated form of the product softens at 100° C. and melts at about 120° C.

The starting material, 7-{γ-[ethyl(β-hydroxyethyl)-amino]propylamino}benz[c]acridine dihydrochloride, can be prepared by reacting 7-chlorobenz[c]acridine and γ-[ethyl(β-hydroxyethyl)amino]propylamine, the latter being prepared starting with monoethylethanolamine and N-(γ-bromopropyl)-phthalimide in accordance with the method for preparing ε-(ethyl-β-hydroxyethylamino)amylamine set out hereinafter.

Example 2

A mixture of 4.5 g. of anhydrous 7-{ε-[ethyl(β-hydroxyethyl)amino]amylamino}benz[c]acridine, dihydrochloride, and 40 cc. of propionyl chloride is stirred and refluxed for 24 hours. The mixture is allowed to cool, 100 cc. of anhydrous ether is added, and the yellow precipitate which separates is collected by filtration and washed with ether. Purification by dissolving the ester in methanol and reprecipitating it with an excess of ether yields 7-{ε-

[ethyl(β-propionoxyethyl)amino]-amylamino}benz[c]acridine, dihydrochloride, of formula,

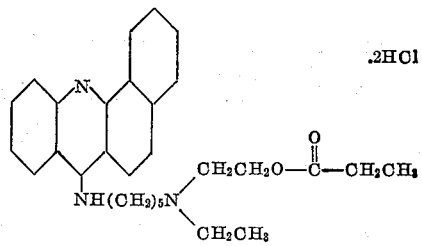

as a yellow powder.

Example 3

A mixture of 5 g. of anhydrous 7-[β-(β-hydroxyethylamino)ethylamino]benz[c]acridine, dihydrochloride, and 50 cc. of acetyl chloride is stirred and heated on the steam bath for 7 hours. The mixture is cooled, diluted with ether, and the solid which precipitates is collected by filtration and washed with ether. The product, 7-[β - (β-acetoxyethylamino)ethylamino]benz[c]acridine, dihydrochloride has the formula,

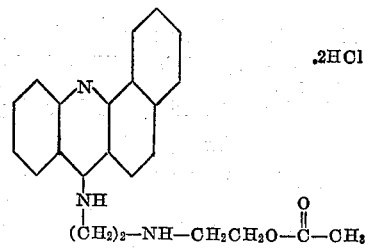

The product, a yellow solid, is hygroscopic, but it becomes stable upon exposure to the atmosphere and melts at 135–145° C. in half-hydrate form.

Example 4

A mixture of 5 g. of anhydrous 7-[β-(β-hydroxyethylamino)ethylamino]benz[c]acridine, dihydrochloride, and 50 cc. of valeryl chloride is stirred and heated on the steam bath for 18 hours. Upon cooling, the mixture is diluted with ether, and the yellow product is collected by filtration and washed thoroughly with ether. Purification by dissolving the product in methanol and reprecipitating with an excess of ether yields the product, 7-[β - (β - valeryloxyethylamino)ethylamino]benz[c]acridine, dihydrochloride, of formula,

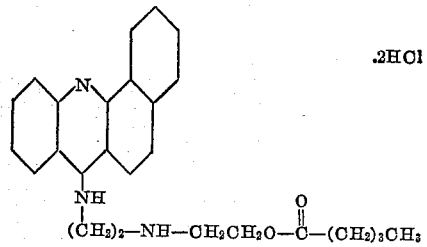

The product, a yellow powder, is hygroscopic and melts at 157–165° C. in dihydrate form.

Example 5

A mixture of 5.0 g. of anhydrous 7-[β-(β-hydroxyethylamino)ethylamino]benz[c]acridine, dihydrochloride, and 50 cc. of palmityl chloride is stirred and heated on the steam bath for 18 hours. The mixture is cooled, diluted with ether, and the solid which precipitates is collected by filtration and washed with ether. The crude waxy product upon recrystallization from methanol gives a yellow product, 7-[β-(β-palmityloxyethylamino)ethylamino]benz[c]acridine, dihydrochloride, of formula,

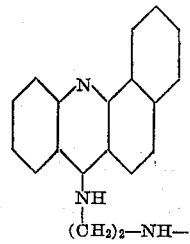

The product forms a monohydrate which melts at 175–180° C.

Example 6

An intimate mixture of 5.0 g. of anhydrous 7-[β-(β-hydroxyethylamino)ethylamino]benz[c]acridine, dihydrochloride, and 1.24 g. of succinic anhydride is heated at 130–140° C. for 20 hours. The resulting melt is allowed to cool, dissolved in hot ethanol, and precipitated with petroleum ether. The precipitated gum is made to solidify by grinding in a mortar under ether. The product 7-[β-(β-succinyloxyethylamino)ethylamino]benz[c]acridine, dihydrochloride, has the formula,

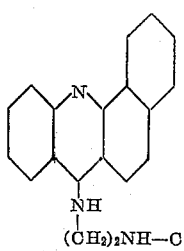

The product, a hydroscopic solid, becomes stabilized upon exposure to the atmosphere and melts with decomposition at 80° C.

Example 7

A mixture of 2.2 g. of anhydrous 7-{γ-[ethyl-(β-hydroxyethyl)amino]propylamino}benz[c]acridine, dihydrochloride, and 40 cc. of palmityl chloride is stirred and heated on the steam bath for 8 hours. Upon cooling, the mixture is diluted with ether, filtered and the precipitate washed thoroughly with ether and cold water. The yellow product thus obtained is 7-{γ-[ethyl(β-palmityloxyethyl)amino]propylamino}benz[c]acridine, dihydrochloride, of formula,

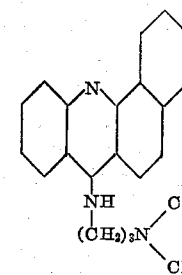

In dihydrate form the product softens at 150° C. and melts at 170° C. with decomposition.

Example 8

A mixture of 4.4 g. of anhydrous 7-{γ-[ethyl-(β-hydroxyethyl)amino]propylamino}benz[c]acridine, dihydrochloride, and 40 cc. of acetyl chloride is refluxed for 24 hours. The mixture is allowed to cool, and 50 cc. of dry ether is added. The yellow precipitate is collected by filtration, washed with ether, and dried in vacuo. Purification by dissolving this product in methanol and reprecipating it with an excess of ether yields 7-{γ-[ethyl-(β-acetoxyethyl)amino]propylamino}benz[c]acridine, dihydrochloride, of formula,

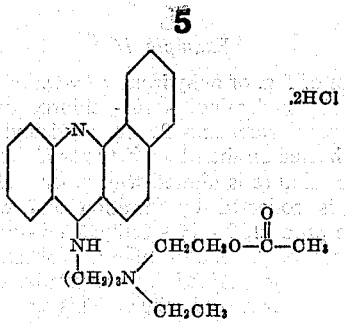

Upon exposure to the atmosphere the product takes up one mole of water in which form the product softens at 169° C., and melts at 175-176° C.

*Example 9*

A mixture of 4.4 g. of anhydrous 7-{γ-[ethyl-(β-hydroxyethyl)amino]propylamino}benz[c]acridine, dihydrochloride, and 40 cc. of heptoyl chloride is heated on the steam bath for 24 hours. Upon cooling, ether is added, and the yellow precipitate is collected by filtration. Purification by dissolving this precipitate in methanol and reprecipitating it with ether gives 7-{γ-[ethyl(β-heptoyloxyethyl)amino]propylamino}benz[c]acridine, dihydrochloride, of formula,

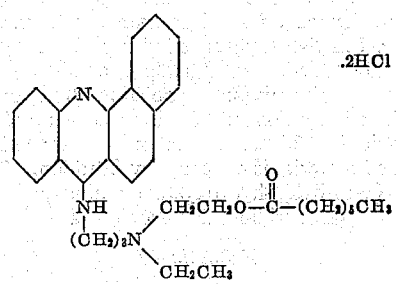

*Example 10*

A mixture of 8.8 g. of 7-chloro-2-methoxybenz[c]acridine and 40 g. of phenol is heated on the steam bath with stirring for 10 minutes, and 4.8 g. of γ-[(ethyl-β-hydroxyethyl)amino]propylamine is added. The mixture is stirred and heated on the steam bath for three hours, cooled, and poured into a stirred solution of 10 cc. of concentrated hydrochloric acid in 125 cc. of acetone. The yellow precipitate thus obtained is collected by filtration, dried, and recrystallized from isopropanol. This product is 2-methoxy-7-{γ-[ethyl(β-hydroxyethyl)-amino]propylamino}benz[c]acridine, dihydrochloride, of formula,

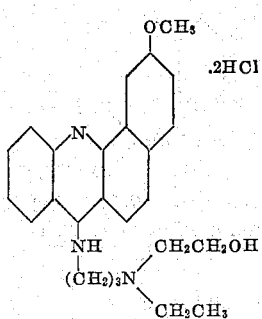

A mixture of 4.8 g. of anhydrous 2-methoxy-7-{γ-[ethyl (β-hydroxyethly) amino] propylamino} benz [c] - acridine, dihydrochloride, and 40 g. of stearoyl chloride is stirred and heated on the steam bath for 24 hours. The mixture is cooled, diluted with ether, filtered, and the product collected and washed with ether and cold water. The product is 2-methoxy-7-{γ-[ethyl(β-stearoyloxyethyl)amino]propylamino}benz[c]acridine, dihydrochloride, of formula,

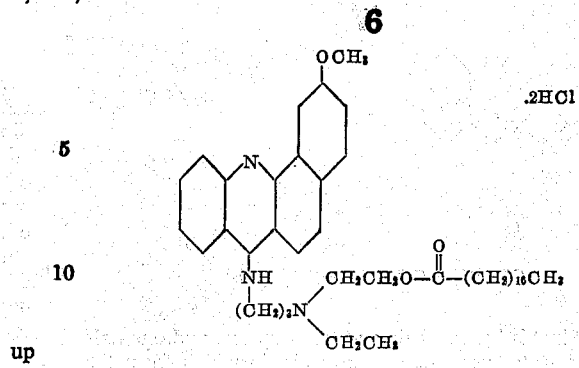

*Example 11*

An intimate mixture of 5.0 g. of anhydrous 7-{γ-[bis-(β - hydroxyethyl)amino]propylamino}benz[c]acridine, dihydrochloride, and 1.08 g. of succinic anhydride is heated at 135° C. for 20 hours. The mixture is cooled, dissolved in boiling ethanol, and the resulting solution is diluted with petroleum ether and chilled overnight. The resulting tar is made to solidify by grinding in a mortar under ether. The product, 7-{γ-[β-hydroxyethyl-(β-succinyloxyethyl) - amino] propylamino } benz [c] acridine dihydrochloride has the formula,

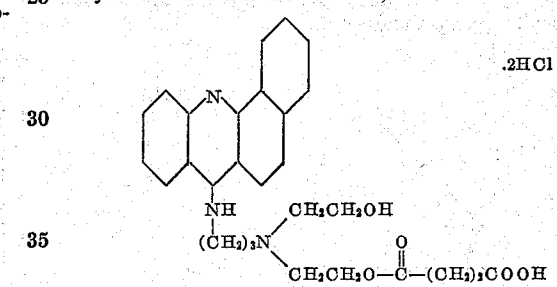

The product is hygroscopic and takes up one-quarter mole of water upon exposure to the atmosphere, in which form the product melts with decomposition at 80° C.

*Example 12*

A mixture of 7 g. of anhydrous 7-{γ-[bis(β-hydroxyethyl)amino]propylamino}benz[c]acridine, dihydrochloride, and 50 cc. of acetyl chloride is stirred and heated on a steam bath for 20 hours. Upon cooling, a yellow product which separates is collected by filtration and is washed with ether. The product is purified by dissolving in isopropanol and reprecipitating with an excess of ether. This product, 7-{γ-bis(β-acetoxyethyl)amino]propylamino}benz[c]acridine, dihydrochloride, has the formula,

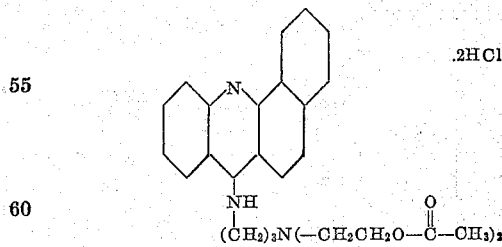

The product is hygroscopic and takes up one and one-half moles of water upon exposure to air.

*Example 13*

A mixture of 7 g. of anhydrous 7-{γ-[bis(β-hydroxyethyl)amino]propylamino}benz[c]acridine, dihydrochloride, and 50 cc. of isocaproyl chloride is stirred and heated on a steam bath for 20 hours. The reaction mixture is cooled and poured into 2 liters of ether. The product which precipitates is collected by filtration, washed with ether, dissolved in ethanol and reprecipitated with an excess of ether. The product, 7-{γ-[bis(β-isocaproyloxyethyl)amino]propylamino}benz[c]acridine, dihydrochloride, has the formula,

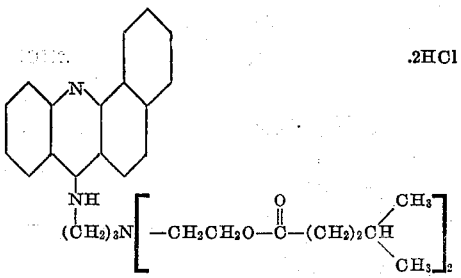

The product is hygroscopic and takes up one and one-half moles of water upon exposure to air, in which form the product melts at 142–144° C. (dec.).

Example 14

A mixture of 5 g. of anhydrous 7-{[bis(β-hydroxyethyl)amino]propylamino}benz[c]acridine, dihydrochloride, and 50 cc. of palmityl chloride is stirred and heated on a steam bath for 24 hours. The reaction mixture is cooled and diluted with ether. The product which precipitates is collected by filtration, washed with ether and recrystallized from methanol. The product, 7-{γ-[bis(β-palmitoyloxyethyl)amino]propylamino}benz[c]acridine, dihydrochloride, has the formula,

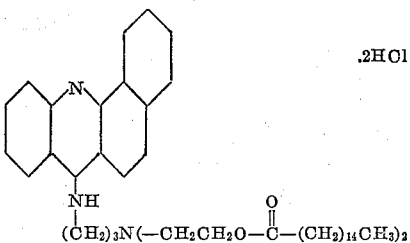

The product is hygroscopic and takes up two and one-half moles of water upon exposure to air, in which form the product melts at 185–186° C.

Example 15

A mixture of 5 g. of anhydrous 7-{γ-[bis(β-hydroxyethyl)amino]propylamino}-10-chlorobenz[c]acridine, dihydrochloride, and 50 cc. of myristoyl chloride is stirred and heated on a steam bath for 22 hours. The reaction mixture is cooled and diluted with ether. The product which precipitates is collected by filtration, washed with ether and recrystallized from a mixture of methanol and ether. The product, 7-{γ-[bis(β-myristoyloxyethyl)-amino]propylamino}-10-chlorobenz[c]acridine, dihydrochloride, has the formula,

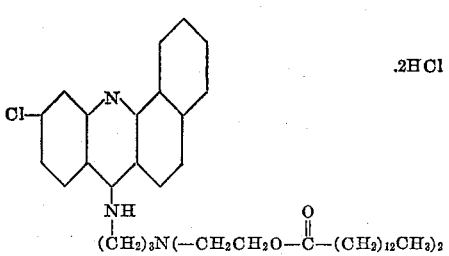

The above benz[c]acridine starting material can be prepared in the following manner: a mixture of 10 g. of 7,10-dichlorobenz[c]acridine and 40 g. of phenol is stirred on a steam bath for 15 minutes and 6.0 g. of γ-[bis(β-hydroxyethyl)amino]propylamine is subsequently added. After heating for about 2 hours on a steam bath, the mixture is cooled to 50° C. and poured into a chilled solution of 10 cc. of concentrated hydrochloric acid in 125 cc. of acetone. After chilling, the precipitated material is collected by filtration. The product is 7-{γ-[bis(β-hydroxyethyl)amino]propylamino}-10-chlorobenz[c]-acridine, dihydrochloride.

Example 16

A mixture of 5 g. of anhydrous 7-{γ-[ethyl(β-hydroxyethyl)amino]propylamino} - 10 - chlorobenz[c] - acridine, dihydrochloride, and 25 cc. myristoyl chloride is stirred and heated on the steam bath for 22 hours. Upon cooling, the mixture is diluted with ether and the yellow precipitate is collected by filtration and washed with ether. The product, 7 - {γ - [ethyl - (β - myristoyloxyethyl)amino]propylamino} - 10 - chlorobenz[c]acridine, dihydrochloride, is purified by recrystallization from a mixture of methanol and ether. This product has the formula,

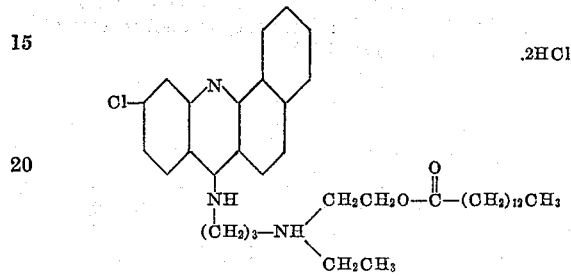

The above benz[c]acridine starting material can be prepared in the following manner: a mixture of 10 g. of 7,10-dichlorobenz[c]acridine and 40 g. of phenol is stirred and heated on a steam bath for 15 minutes and 5.5 g. of γ-[ethyl-(β-hydroxyethyl)amino]propylamine is subsequently added. After heating for about 2 hours on the steam bath, the mixture is cooled to 50° C. and poured into a chilled solution of 10 cc. of concentrated hydrochloric acid in 125 cc. of acetone. After chilling, the precipitated material is collected by filtration. The product is 7-{γ-[ethyl(β-hydroxyethyl)amino]propylamino}-10-chlorobenz[c]acridine, dihydrochloride.

Example 17

A mixture of 2.3 g. of anhydrous 7-{γ-[ethyl-(β-hydroxyethyl)amino]propylamino}-10-methylbenz[c]acridine, dihydrochloride, and 20 cc. of valeryl chloride is stirred and heated at steam bath temperature for 16 hours. Upon cooling, the mixture is diluted with ether and the precipitate which forms is collected by filtration and washed with ether. The product is redissolved in methanol and reprecipitated with ether, filtered and dried in vacuo. This product, 7 - {γ - [ethyl - (β - valeryloxyethyl)amino]propylamino} - 10 - methylbenz[c]acridine, dihydrochloride, has the formula,

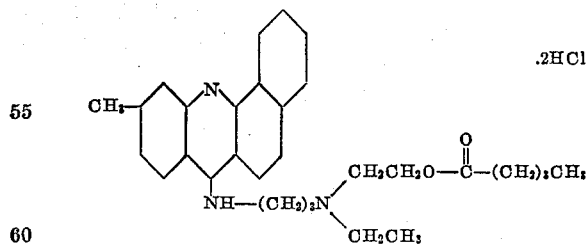

The starting material, 7-{γ-[ethyl-(β-hydroxyethyl)-amino]propylamino}-10-methylbenz[c]acridine, dihydrochloride, can be prepared in the following manner.

A mixture of 3.82 g. of 2-chloro-4-methylbenzoic acid, 18.0 g. of α-naphthylamine, 4.0 g. of anhydrous potassium carbonate, 0.1 g. of potassium iodide and 0.5 g. of precipitated copper is stirred and heated at 180° C. for 3½ hours. The mixture is extracted with benzene and water while still warm, and the combined aqueous extracts are filtered and the filtrate acidified with 2 N hydrochloric acid. 4 - methyl-2-(α-naphthylamino)benzoic acid separates and is collected by filtration and crystallized from a water-ethanol mixture. 2.1 g. of 4-methyl-2-(α-naphthylamino)benzoic acid and 30 cc. of redistilled phosphorus oxychloride is refluxed for two hours. Excess phosphorus oxychloride is removed in vacuo, and the residue is slowly poured into an excess of ice and concentrated ammonium hydroxide solution. The mixture is extracted with benzene, the benzene is removed in vacuo, and the residue crystallized from petroleum ether (B. P. 80–100° C.) to give 7-chloro-10-methylbenz[c]acridine, M. P. 149–150° C. A mixture of 2.78 g. of 7-chloro-10-methylbenz[c]acridine and 5 g. of phenol is stirred and heated on a steam bath for 10 minutes and 1.6 g. of γ-[(ethyl-β-hydroxyethyl)amino]-propylamine is added. The mixture is stirred and heated on a steam bath for 3 hours, cooled, and poured into a stirred mixture of 5 cc. of concentrated hydrochloric acid and 60 cc. of acetone. An oil separates and is induced to solidify by scratching. After collection by filtration, the solid product, 7-{γ-[ethyl-(β-hydroxyethyl)-amino]propylamino}-10-methylbenz[c]acridine, dihydrochloride, is recrystallized from ethanol-ether as a yellow microcrystalline powder.

*Example 18*

A solution of 4.5 g. of 3-hydroxy-2-naphthoic acid in 100 ml. of ether is slowly added to a solution of 10 g. of 7-{γ-[bis(β-palmityloxyethyl)amino]propylamino}-benz[c]acridine in 100 ml. of methanol. The oily salt which separates is purified by dissolving in ethanol and reprecipitating with ether. The product is the 3-hydroxy-2-naphthoic acid disalt of 7-{γ-[bis(β-palmityloxyethyl)amino]propylamino}benz[c]acridine, having the formula,

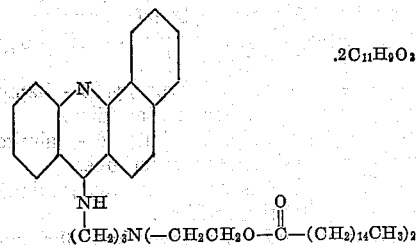

*Example 19*

A solution of 4.5 g. of salicylic acid in 100 ml. of ether is slowly added to a solution of 10 g. of 7-{γ-[ethyl-(β-myristoyloxyethyl)amino]propylamino} - 10 - chlorobenz[c]acridine in 100 ml. of methanol. The oily salt which separates is solidified by chilling and scratching and is purified by dissolving in ethanol and recipitating with ether. The product is the disalicylic acid salt of 7 - {γ-[ethyl-(β-myristoyloxyethyl)amino]propylamino}-10-chlorobenz[c]acridine, having the formula,

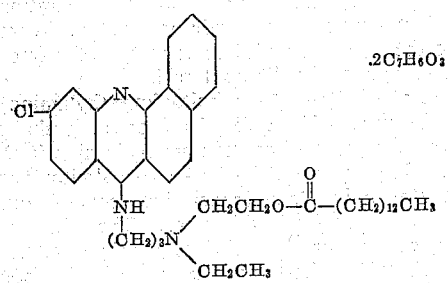

*Example 20*

To 10 g. of 2-methoxy-7-{γ-[ethyl-(β-stearoyloxyethyl)amino]propylamino}benz[c]acridine, dihydrochloride, in 100 ml. of methanol is added with stirring a solution of 10.5 g. of sodium 8-hydroxy-7-iodo-5-quinoline sulfonate in 50 cc. of warm water. The mixture is allowed to stand for ten minutes and the precipitate which forms is collected by filtration and washed successively with small volumes of water and ether. The filter cake which consists of the 8-hydroxy-7-iodo-5-quinoline sulfonic acid disalt of 2-methoxy-7-{γ-[ethyl(β-stearoyloxyethyl)amino]propylamino}benz[c]acridine is purified by recrystallization from aqueous ethanol. This product has the formula,

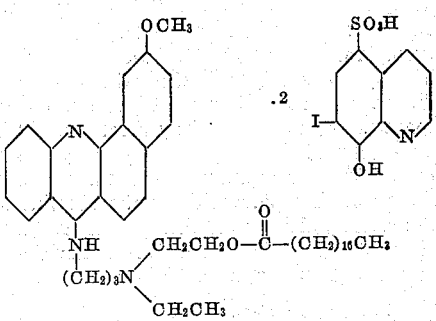

The 7 - [(β-hydroxyethyl)aminoalkylamino]benz[c]-acridine compounds used as starting materials in the practice of the invention can be prepared by reacting an o-chlorobenzoic acid with an α-naphthylamine, treating the o-(α-naphthylamino)benzoic acid so obtained with phosphorus oxychloride thereby producing the corresponding 7-chlorobenz[c]acridine compound and reacting this latter compound with a hydroxyalkylaminoalkylamine. The hydroxyalkylaminoalkylamines can be prepared by reacting an N-(bromoalkyl)phthalimide with a hydroxyalkylamine and subjecting the resulting product to acid hydrolysis.

The preparation of the 7-[(β-hydroxyethyl)aminoalkylamino]benz[c]acridine compounds is illustrated by the following specific examples:

*7-chlorobenz[c]acridine.*—In a vessel fitted with a moisture trap 276 g. of powdered anhydrous potassium carbonate is added to a mixture of 7 l. of dry iso-amyl alcohol and 626 g. of o-chlorobenzoic acid and the resulting mixture is refluxed to drive off water evolved in the formation of the potassium salt of the acid. When all of the water has been removed, 2 l. of dry iso-amyl alcohol is collected by distillation and 573 g. of α-naphthylamine is dissolved in the dry distillate. While refluxing and stirring are maintained, 4 g. of copper-bronze catalyst is added, followed by the slow addition of the dry α-naphthylamine solution over a period of one hour, and the mixture is refluxed for 24 hours. Upon cooling, the precipitate which forms is removed by filtration and the filtrate is evaporated to dryness in vacuo. The residue is triturated with low boiling petroleum ether and air dried; the product is N-α-naphthylanthranilic acid, M. P. 180–185° C.; 430 g. of N-α-naphthylanthranilic acid and 2.4 kg. of phosphorous oxychloride are mixed together with slow heating to 50° C. at which temperature a vigorous exothermic reaction occurs. After the reaction has subsided, the solution is refluxed for three hours and the phosphorous oxychloride is removed in vacuo. The residue is slurried with 4 l. of dry chloroform and the mixture slowly stirred into a large excess of ammonium hydroxide and ice with mechanical stirring. In order to prevent acridone formation, the temperature must be maintained below 10° C. by continued addition of ice, and the mixture must be kept strongly alkaline by the frequent addition of concentrated ammonium hydroxide. After addition of the slurry, 8 l. of chloroform is added to dissolve the product, and the resulting strongly alkaline mixture is stirred vigorously below 10° C. for two hours. The chloroform and aqueous layers formed on standing are separated, and the chloroform layer is dried over anhydrous potassium carbonate and the chloroform removed in vacuo. The residue is slurried with 1 l. of cold methanol and the solid product collected by filtration and air dried. This product is 7-chlorobenz[c]acridine, M. P. 144–145° C.

*ε-(Ethyl-β-hydroxyethylamino)amylamine.*—A mixture of 480 g. of monoethylethanolamine, 220 g. of N-(ε- bromoamyl)-phthalimide and 2 l. of xylene is refluxed for 18 hours. Upon cooling, one mole of potassium carbonate is added with stirring and the xylene and excess amine are removed in vacuo. The residue is extracted with methylene chloride, and the methylene chloride is removed in vacuo from the extract leaving N-[ε-(ethyl-β-hydroxyethylamino)amyl]-phthalimide as a viscous oil. The oil is hydrolyzed by refluxing with 400 cc. of 20% hydrochloric acid for 4 hours. Upon cooling, phthalic acid separates and is collected by filtration. Neutralization of the filtrate with a saturated potassium hydroxide solution at 10° C. causes the free amine to separate as an oil. The oil is separated from the alkaline solution, and is repeatedly dried over solid potassium hydroxide. Distillation of the oil in vacuo gives ε-(ethyl-β-hydroxyethylamino)amylamine; B. P. 103–150° C. at 1.5 mm., $n_D^{25}$ 1.4870.

*7[ε - (ethyl-β-hydroxyethylamino)amylamino]benz[c]acridine dihydrochloride.*—A mixture of 10 g. of 7-chlorobenz[c]acridine and 40 g. of phenol is stirred and heated on a steam bath for 15 minutes, and 6.7 g. of ε-(ethyl-β-hydroxyethylamino)amylamine is then added. After heating for two hours the mixture is cooled and poured into a solution of 10 cc. of concentrated hydrochloric acid in 125 cc. of acetone. After chilling, the product, 7-{ε-[ethyl(β - hydroxyethyl)amino]amylamino}benz[c]acridine dihydrochloride, precipitates out. The product is collected by filtration and purified by recrystallization from ethanolethyl acetate solution.

In addition to the compounds specifically referred to under the above examples the following are representative examples of the class of compounds constituting our invention, it being understood that while they are listed as the free base, the invention includes the salts also as hereinbefore stated:

1. 7-{β-[amyl-(β-propionoxyethyl)amino]ethylamino}-benz[c]acridine.
2. 7-[β-(β-butyryloxyethylamino)ethylamino] - 10-bromobenz[c]acridine.
3. 7-[β-(β - capronyloxyethylamino)ethylamino]benz[c]acridine.
4. 2-methoxy - 7 - [β-(β-heptoyloxyethylamino)ethylamino]benz[c]acridine.
5. 7-[β - (β - pelargonyloxyethylamino)ethylamino]-benz[c]acridine.
6. 7-{β-[methyl - (β - lauroyloxyethyl)amino]ethylamino}benz[c]acridine.
7. 7-[β - (β - myristoyloxyethylamine)ethylamino]-10-ethylbenz[c]acridine.
8. 7-[β - (β - stearyloxyethylamino)ethylamino]benz[c]acridine.
9. 4-ethoxy - 7 - [γ-(β-propionoxyethylamino)proplyamino]benz[c]acridine.
10. 7-{γ-[methyl-(β - butyryloxyethyl)amino]-propylamino}benz[c]acridine.
11. 7-{γ - [propyl-(β-caproyloxyethyl)amino]propylamino}benz[c]acridine.
12. 2-methoxy-7-[γ - (β - pelargonyloxyethylamino)-propylamino]benz[c]acridine.
13. 7 - {γ - [butyl-(β-lauroyloxyethyl)amino]-propylamino}-10-chlorobenz[c]acridine.
14. 7 - [γ - (β - heptadecanoyloxyethylamino)propyl-amino]benz[c]acridine.
15. 7 - {δ - [ethyl - (β - acetoxyethyl)amino]butyl-amino}benz[c]acridine.
16. 7 - {δ - [ethyl - (β - propionoxyethyl)amino] - butylamino} - 10 - methoxybenz[c]acridine.
17. 7 - [δ - (β - succinyloxyethylamino)butylamino] - benz[c]acridine.
18. 7 - {δ - [methyl - (β - valeryloxyethyl)amino] - butylamino}benz[c]acridine.
19. 7 - {δ - [ethyl - (β - pelargonloxyethyl)amino] butylamino}benz[c]acridine.
20. 7 - {δ - [ethyl - (β - lauroyloxyethyl)amino]butyl - amino} - 10 - ethylbenz[c]acridine.
21. 7 - {δ - [ethyl - (β - myristoyloxyethyl)amino] butylamino}benz[c]acridine.
22. 2 - methoxy - 7 - {δ - [methyl - (β - palmitoyloxyethyl) - amino]butylamino}benz[c]acridine.
23. 7 - [δ - (β - stearyloxyethylamino)butylamino] - benz[c]acridine.
24. 7 - [ε - (β - acetoxyethylamino)amylamino]benz - [c]acridine.
25. 7 - {ε - [methyl - (β - valeryloxyethyl)amino] - amylamino}benz[c]acridine.
26. 4 - methoxy - 7 - {ε - [ethyl - (β - caprylyloxyethyl) - amino]amylamino}benz[c]acridine.
27. 7 - [ε - (β - lauroyloxyethylamino)amylamino] - benz[c]acridine.
28. 7 - {ε - [ethyl - (β - myristoyloxyethyl)amino] - amylamino} - 10 - ethoxybenz[c]acridine.
29. 7 - [ε - (β - palmityloxyethylamino)amylamino] - benz[c]acridine.
30. 7 - {ε - [ethyl - (β - stearyloxyethyl)amino] - amylamino}benz[c]acridine.
31. 7 - {β - [bis(β - succinyloxyethyl)amino] - ethylamino}benz[c]acridine.
32. 2 - methoxy - 7 - {γ - [ε - palmityloxyamyl(β - palmityloxyethyl)amino]propylamino}benz[c]acridine.
33. 7 - {γ - [δ - stearyloxybutyl(β - stearyloxyethyl) - amino]propylamino}benz[c]acridine.
34. 7 - {ε - [bis(β - palmityloxyethyl)amino] - amylamino} - 10 - chlorobenz[c]acridine.
35. 7 - {δ - [bis(β - myristoyloxyethyl)amino] - butylamino}benz[c]acridine.
36. 4 - ethoxy - 7 - {γ - [ε - lauroyloxyamyl(β - lauroyloxyethyl)amino]propylamino}benz[c]acridine.
37. 7 - {β - [ε - succinyloxyamyl(β - succinyloxyethyl) - amino]ethylamino}benz[c]acridine.
38. 7 - {γ - [γ - heptoyloxypropyl(β - heptoyloxyethyl)amino]propylamino}benz[c]acridine.
39. 7 - {ε - [δ - palmitoyloxybutyl(β - palmitoyloxyethyl)amino]amylamino}benz[c]acridine.
40. 7 - {δ - [bis(β - stearyloxyethyl)amino]butyl - amino} - 10 - ethylbenz[c]acridine.

In accordance with the invention, the new 7 - [ω - (β - acyloxyethyl)aminoalkylamino]benz[c]acridine compounds can be converted from the acid addition salt form to the free base form by dissolving the compounds in a suitable solvent such as water and neutralizing the solution with an inorganic or organic base such as sodium hydroxide, ammonium hydroxide, sodium carbonate, potassium carbonate, tertiary organic amines and the like. In some instances it will be desirable to obtain the acid addition salt from the free base. The salt can be prepared by reaction of the free base with the corresponding organic or inorganic acid in a suitable solvent. The following specific example serves as an illustration of the method of converting the addition salt of hydrochloric acid to the free base and then converting the free base to the addition salt of a different acid.

0.5 g. of 7 - [β - (β - palmitoyloxyethylamino)ethyl - amino]benz[c]acridine, dihydrochloride, is shaken with 1 ml. of concentrated ammonium hydroxide in 9 ml. of water. The free base, 7 - [β - (β - palmitoyloxyethyl - amino)ethylamino] benz[c]acridine, separates out and is isolated and extracted with ether. The ether extract is washed with water and dried over anhydrous potassium carbonate. If desired the free base can be isolated in pure form by filtering off the potassium carbonate and removing the ether in vacuo. Upon addition of an alcoholic solution of citric acid to the ether solution of the free base the yellow citric acid salt of 7 - [β - (β - palmitoyloxyethylamino)ethylamino]benz[c]acridine precipitates out. This compound is recovered in pure form by filtration and washing the precipitate with alcohol.

What we claim is:

1. A compound of the class consisting of a free base and its acid addition salts, said free base having the formula,

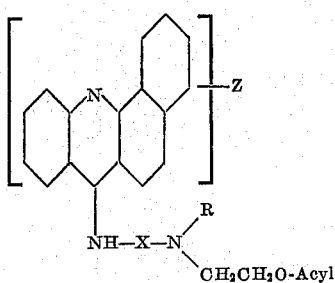

where Z is a member of the group consisting of hydrogen, halogen, alkyl and alkoxy radicals, said alkyl and alkoxy radicals containing not more than 2 carbon atoms; X is a divalent alkyl group containing from 2 to 5 carbon atoms; R is a member of the group consisting of hydrogen and lower alkyl radicals and lower hydroxyalkyl radicals and acyl derivatives thereof having the formula alkylene·O·Acyl; and Acyl is an aliphatic carboxylic acid acyl residue containing from 2 to 18 carbon atoms.

2. An acid addition salt of a free base having the formula,

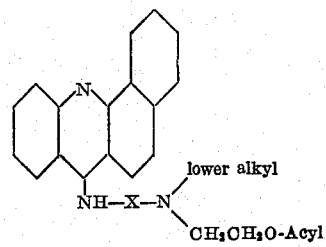

where X is a divalent alkyl group containing from 2 to 5 carbon atoms and Acyl is an alkyl carboxylic acid acyl residue containing from 2 to 18 carbon atoms.

3. An acid addition salt of a free base having the formula,

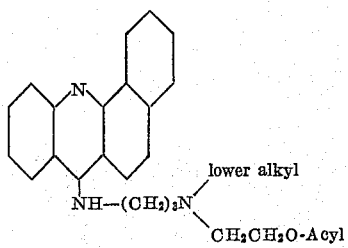

where Acyl is an alkyl carboxylic acid acyl residue containing from 2 to 18 carbon atoms.

4. An acid addition salt of a free base having the formula,

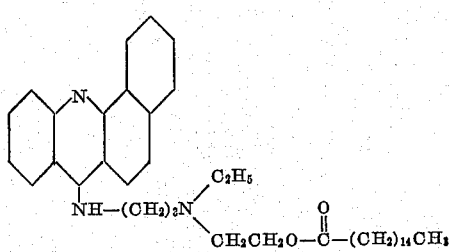

5. An acid addition salt of a free base having the formula,

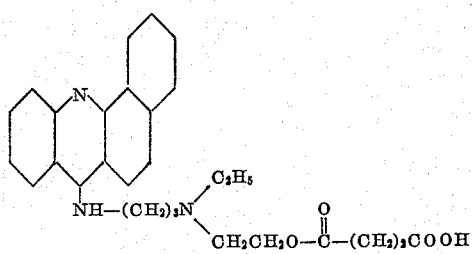

6. Process of producing a compound of the class consisting of a free base and its acid addition salts, said free base having the formula,

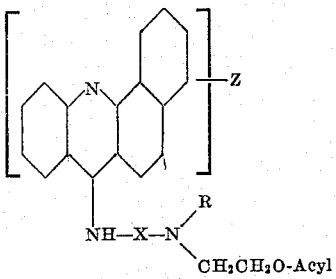

which comprises reacting under anhydrous conditions at a temperature above 50° C. a compound of the class consisting of a free base and its acid addition salts, said free base having the formula,

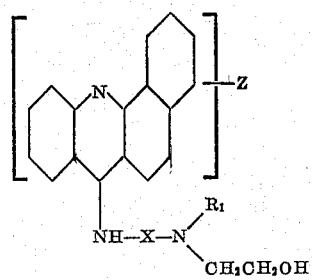

with an acylating agent of the class consisting of acyl halides and acyl anhydrides having an aliphatic carboxylic acid acyl residue containing from 2 to 18 carbon atoms; where Z is a member of the group consisting of hydrogen, halogen, alkyl and alkoxy radicals, said alkyl and alkoxy radicals containing not more than 2 carbon atoms, X is a divalent alkyl group containing from 2 to 5 carbon atoms, R is a member of the group consisting of hydrogen and lower alkyl radicals and hydroxy alkyl radicals and acyl derivatives thereof having the formula alkylene-O-Acyl, $R_1$ is a member of the group consisting of hydrogen, lower alkyl and lower hydroxyalkyl radicals, and Acyl is an aliphatic carboxylic acid acyl residue containing from 2 to 18 carbon atoms.

7. Process according to claim 6 wherein R and $R_1$ each represent a lower alkyl radical.

8. 7 - {γ - [ethyl - (β - palmityloxyethyl)amino]propylamino}-benz[c]acridine, dihydrochloride.

9. Process of producing a hydrochloride salt of 7-γ-[ethyl-(β-palmityloxyethyl)-amino]propylamino benz[c] acridine which comprises reacting under anhydrous conditions (at a temperature above 50° C.) a hydrochloride salt of 7-γ-[ethyl-β-hydroxyethyl)amino]-propylamino benz[c]acridine with a substantially equivalent proportion of palmityl halide.

References Cited in the file of this patent

UNITED STATES PATENTS 2,006,020   Jacobson _____ June 25, 1935

OTHER REFERENCES

Wiselogle: Survey of Anti-Malarial Drugs, vol. II, sec. 2, page 1380 (1946).